United States Patent
Jang et al.

(10) Patent No.: US 10,358,139 B2
(45) Date of Patent: Jul. 23, 2019

(54) INTEGRATED ANALYSIS SYSTEM AND METHOD FOR RESPONDING TO SUDDEN ACCELERATION OF A VEHICLE

(71) Applicant: Dong-eui University Industry-Academic Cooperation Foundation, Busan (KR)

(72) Inventors: Jongwook Jang, Busan (KR); Jeahui Cha, Yangan-si (KR); Taehyeong Kim, Busan (KR)

(73) Assignee: Dong-Eui University Industry-Academic Cooperation Foundation, Busan (KR)

(*) Notice: Subject to any disclaimer, the term of this patent is extended or adjusted under 35 U.S.C. 154(b) by 0 days.

(21) Appl. No.: 15/787,119

(22) Filed: Oct. 18, 2017

(65) Prior Publication Data
US 2018/0111624 A1    Apr. 26, 2018

(30) Foreign Application Priority Data
Oct. 21, 2016    (KR) .................. 10-2016-0137549

(51) Int. Cl.
*B60W 40/10*    (2012.01)
*B60W 50/08*    (2012.01)
(Continued)

(52) U.S. Cl.
CPC ........ *B60W 40/107* (2013.01); *B60W 40/105* (2013.01); *B60W 50/08* (2013.01);
(Continued)

(58) Field of Classification Search
CPC .. B60W 40/107; B60W 50/08; B60W 40/105; B60W 2550/402; B60W 50/02;
(Continued)

(56) References Cited

U.S. PATENT DOCUMENTS

2011/0178680 A1*  7/2011  Kato .................... B60N 2/002
                                                    701/41

FOREIGN PATENT DOCUMENTS

JP    2002-185647 A     6/2002
KR    2011-0077443 A  *  7/2011
(Continued)

*Primary Examiner* — Rodney A Butler
(74) *Attorney, Agent, or Firm* — Rabin & Berdo, P.C.

(57) ABSTRACT

An integrated analysis system includes a data collector configured to acquire an image of an accelerator pedal and an image of a brake pedal for vehicle control and collect on-board diagnostic (OBD) data, distance measurement values obtained by measuring an extent to which the accelerator pedal and the brake pedal are applied, and a decibel value of an inside of a vehicle resulting from a sudden acceleration; a data integrator configured to perform an integration process by overlaying the measured data on the image collected by the data collector; a sudden acceleration determiner configured to determine the sudden acceleration of the vehicle by using image data integrated information integrated by the data integrator; and an image display configured to provide a driver with sudden acceleration determination information obtained from the sudden acceleration determiner, the image data integrated information, vehicle driving information using the OBD data, and emergency relief information.

5 Claims, 4 Drawing Sheets

(51) Int. Cl.
  *B60W 40/107* (2012.01)
  *B60W 40/105* (2012.01)
  *B60W 50/14* (2012.01)
  *B60W 50/02* (2012.01)

(52) U.S. Cl.
  CPC ....... *B60W 50/02* (2013.01); *B60W 2050/146* (2013.01); *B60W 2420/54* (2013.01); *B60W 2520/105* (2013.01); *B60W 2540/10* (2013.01); *B60W 2540/12* (2013.01); *B60W 2550/402* (2013.01); *B60W 2750/40* (2013.01)

(58) Field of Classification Search
  CPC ......... B60W 2750/40; B60W 2420/54; B60W 2540/12; B60W 2050/146; B60W 2540/10; B60W 2520/105
  See application file for complete search history.

(56) References Cited

FOREIGN PATENT DOCUMENTS

| | | | |
|---|---|---|---|
| KR | 10-2011-0088284 A | | 8/2011 |
| KR | 2012-0112334 A | * | 10/2012 |
| KR | 10-2013-0022297 A | | 3/2013 |
| KR | 10-2014-0089022 A | | 7/2014 |
| KR | 10-2014-0101145 A | | 8/2014 |
| KR | 10-2016-0002185 A | | 1/2016 |

* cited by examiner

VARY UI ACCORDING TO USE OF PEDAL

IMAGE OF ACCELERATOR IS ENLARGED IN PROPORTION
TO EXTENT TO WHICH ACCELERATOR IS APPLIED

IMAGE OF BRAKE IS ENLARGED IN PROPORTION TO
EXTENT TO WHICH BRAKE IS APPLIED

INTEGRATED ANALYSIS SYSTEM AND METHOD FOR RESPONDING TO SUDDEN ACCELERATION OF A VEHICLE

CROSS-REFERENCE TO RELATED APPLICATION

This application claims priority to and the benefit of Korean Patent Application No. 10-2016-0137549, filed on Oct. 21, 2016, the disclosure of which is incorporated herein by reference in its entirety.

STATEMENT REGARDING SPONSORED RESEARCH

This research was supported by the MSIT (Ministry of Science and ICT), Korea, under the Grand Information Technology Research Center support program (IITP-2017-2016-0-00318) supervised by the IITP (Institute for Information & Communications Technology Promotion).

BACKGROUND

1. Field of the Invention

The present disclosure relates to a system for handling an accident due to sudden acceleration of a vehicle, and more particularly, to an integrated analysis system and method for responding to sudden acceleration of a vehicle which is capable of effectively handling an accident due to sudden acceleration of a vehicle through an integrated analysis of an image and a measuring sensor measurement value.

2. Discussion of Related Art

Recently, vehicles have been remarkably developed in performance and appearance and are evolving into next generation vehicles which utilize a variety of convenient apparatuses.

Along with the evolution of vehicles, a vehicle management system for managing and controlling various mechanical or electrical apparatuses applied to a vehicles and also an on-board diagnostic (OBD) system for detecting internal defects of the vehicle in connection with the vehicle management system are continuously evolving. These systems are released in combination with other systems for providing entertainment.

Due to the development of the vehicle systems, unintentional user errors have occurred, and a representative example of such an error is sudden acceleration.

Sudden acceleration refers to a forward or backward movement of a vehicle set in motion occurring by itself without a driver manipulating an acceleration pedal. When a vehicle moves forward or backward by itself, it is likely to cause a situation in which breakage of the vehicle and danger to a driver of the vehicle and a pedestrian walking around the vehicle during the sudden acceleration occur.

A statistical analysis of an accident due to sudden acceleration of a vehicle reveals that a total of 482 accidents from 2010 to July 2015 suspected of involving sudden acceleration of a vehicle have occurred in Korea.

Even more serious is the fact that the number of vehicles in which deployment of an air bag at a moment of sudden acceleration fails is 209, accounting for 43.4% of the total accidents, which shows that air bags cannot secure safety of drivers in unexpected situations.

Since such sudden acceleration of a vehicle occurs instantly, a driver cannot handle the situation properly. Depending on the situation, even when a braking apparatus is operated, the speed of the vehicle that is abruptly started may not be slowed down, and the braking apparatus may not even normally operate.

There have been a number of civil complaints concerning accidents due to sudden acceleration of a vehicle, and thus car manufacturing companies and research and test companies have been performing multidimensional analysis on the cause of sudden acceleration but have failed to identify the real cause and only estimated that the accidents may be caused by a malfunction of a program of an Electronic Control Unit (ECU) for detecting overall state information of a vehicle and controlling relevant operations thereof.

Accordingly, a situation at a moment when such an accident occurs is unknown when a witness to sudden acceleration is not secured, and it is difficult to make an accurate judgment on conflicting statements between an offender and a victim with regard to the cause of the accident such that disputes frequently occur between the offender and the victim.

In this case, even the police, an insurance company, and the like have difficulty in making an accurate judgment, and thus a social cost such as a lawsuit has significantly increased.

In order to analyze and prevent sudden acceleration of a vehicle, various analysis and prevention systems for sudden acceleration of a vehicle have been developed. However, the existing analysis and prevention systems for sudden acceleration of a vehicle are not provided in a separate module, and thus have difficulty in attachment/detachment on the basis of an OBD port.

Such a difficulty results in an inconvenience in modifying an only circuit of the vehicle.

Currently, as for accidents due to sudden acceleration of a vehicle, an Event Data Recorder (EDR) system is used to determine sudden acceleration of a vehicle. However, in most cases, information of the EDR is open only to manufacturing companies and drivers are not able to view the information such that most of accidents suspected to be accidents due to sudden acceleration are determined to be caused by driver error and there is no support for drivers.

RELATED ART DOCUMENT

Patent Document (Patent Document 1): Korean Laid-open Patent Publication No. 10-2014-0089022
(Patent Document 1): Korean Laid-open Patent Publication No. 10-2016-0002185

SUMMARY OF THE INVENTION

In order to solve the above-described limitations of a conventional system for analyzing and preventing sudden acceleration of a vehicle, the present disclosure is directed to providing an integrated analysis system for responding to sudden acceleration of a vehicle which is capable of effectively handling an accident due to sudden acceleration of a vehicle through an integrated analysis of an image and a measuring sensor measurement value, and an integrated analysis method thereof.

The present disclosure is directed to providing an integrated analysis system for responding to sudden acceleration of a vehicle which is capable of effectively handling an accident due to sudden acceleration of a vehicle through an integrated analysis of an image, measurement values of an accelerator distance measuring sensor and a brake distance measuring sensor, and a decibel measurement value at a time of sudden acceleration, and an integrated analysis method thereof.

The present disclosure is directed to providing an integrated analysis system for responding to sudden acceleration of a vehicle in which an extent to which a vehicle pedal is applied is measured by using a sensor provided on a controller (an accelerator and a brake) of a vehicle to determine whether a driver has applied the brake or the accelerator at a time of sudden acceleration of the vehicle such that whether an accident due to the sudden acceleration is caused by a simple manipulation mistake is determined, and an integrated analysis method thereof The present disclosure is directed to providing an integrated analysis system for responding to sudden acceleration of a vehicle in which, in order to determine whether an accident due to sudden acceleration of a vehicle is caused by driver error, a current control state of an accelerator and a brake of the vehicle are acquired as an image by a camera and a sensor attached to the accelerator and the brake of the vehicle and an extent to which the accelerator or the brake is currently being applied is measured as a distance and is stored together with the acquired image so that a party who caused the accident due to the sudden acceleration may be determined, thereby determining the true cause of the accident due to the sudden acceleration, and an integrated analysis method thereof.

The present disclosure is directed to providing an integrated analysis system for responding to sudden acceleration of a vehicle in which an extent to which a vehicle pedal is applied is measured such that data measured by a sensor module is overlaid on an acquired image with a data value arrayed on the image so that a driver may simultaneously check the image and the data value, and an integrated analysis method thereof.

The present disclosure is directed to providing an integrated analysis system for responding to sudden acceleration of a vehicle, the system configured to allow a driver to simultaneously check an image and a data value by having data measured by a sensor module overlaid on an acquired image with the data value arrayed on the image, and allow information about an accident to be checked on a mobile terminal or the Internet through a microcontroller unit (MCU) while continuously collecting internal information of the vehicle by using on-board diagnostic (OBD)-II, and an integrated analysis method thereof.

The present disclosure is directed to providing an integrated analysis system for responding to sudden acceleration of a vehicle which allows a user to intuitively identify a vehicle control state by varying sizes of an accelerator pedal and a brake pedal in an image provided to the driver according to an extent to which the accelerator and the brake is applied, and an integrated analysis method thereof.

The technical objectives of the present disclosure are not limited to those disclosed above, and other objectives may become apparent to those of ordinary skill in the art on the basis of the following description.

One aspect of the present invention provides an integrated analysis system for responding to sudden acceleration of a vehicle, the integrated analysis system including a data collector configured to acquire an image of an accelerator pedal and an image of a brake pedal for vehicle control, and collect OBD data, distance measurement values obtained by measuring an extent to which the accelerator pedal and the brake pedal are applied, and a decibel value of an inside of a vehicle resulting from sudden acceleration; a data integrator configured to perform an integration process by overlaying the measured data on the image collected by the data collector; a sudden acceleration determiner configured to determine the sudden acceleration of the vehicle by using image data integrated information integrated by the data integrator; and an image display configured to provide a driver with sudden acceleration determination information obtained from the sudden acceleration determiner, the image data integrated information, vehicle driving information using the OBD data, and emergency relief information.

The data collector may include an OBD data module configured to continuously collect internal information of the vehicle by using OBD-II; a camera module configured to acquire the image of the accelerator pedal and the image of the brake pedal for vehicle control; a first distance measuring sensor configured to measure the extent to which the accelerator pedal is applied; a second distance measuring sensor configured to measure the extent to which the brake pedal is applied; and a decibel measuring sensor configured to collect the decibel value of the inside of the vehicle due to the sudden acceleration.

The image display may include: a sudden acceleration determination information display area determined by the sudden acceleration determiner; an image data integrated information display area allowing the driver to simultaneously check the image and a data value by having data measured by a sensor module overlaid on the acquired image with the data value arrayed on the image; a vehicle driving information display area using the OBD data; and an emergency relief guidance area configured to provide guidance at a time of the occurrence of the sudden acceleration such that an emergency is reported on the basis of GPS information.

The image data integrated information display area may display the images of the accelerator and the brake with a size varied according to the extent to which the brake and the accelerator are applied.

The emergency relief guidance area may be configured to report an emergency at the time of the occurrence of the sudden acceleration while sending unique information including a vehicle type and a vehicle license number, and may have a user interface (UI) provided with a function of canceling the report to prevent an erroneous report.

Another aspect of the present invention provides an integrated analysis method including acquiring by a data collector, an image of an accelerator pedal and an image of a brake pedal for vehicle control and collecting OBD data, distance measurement values obtained by measuring an extent to which the accelerator pedal and the brake pedal are applied, and a decibel value of an inside of a vehicle resulting from sudden acceleration; performing, by a data integrator, an integration process by overlaying the measured data on the image collected by the data collector; determining, by a sudden acceleration determiner, the sudden acceleration of the vehicle by using image data integrated information integrated by the data integrator; and displaying, by an image display, an image for providing a driver with sudden acceleration determination information, the image data integrated information, vehicle driving information using the OBD data, and emergency relief information.

In the displaying of the image, the images of the accelerator and the brake may be displayed with a size varied according to the extent to which the brake and the accelerator are applied.

The displaying of the image may include reporting an emergency at a time of the occurrence of the sudden acceleration while sending unique information including a vehicle type and a vehicle license number, and an emergency relief guidance area may have a UI provided with a function of canceling the report to prevent an erroneous report.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, an exemplary embodiment of an integrated analysis system and method for responding to sudden acceleration of a vehicle according to the present disclosure will be described in detail.

The features and advantages of the integrated analysis system and method for responding to sudden acceleration of a vehicle according to the present disclosure will become more apparent by describing the exemplary embodiment thereof in detail below.

Figure 1:
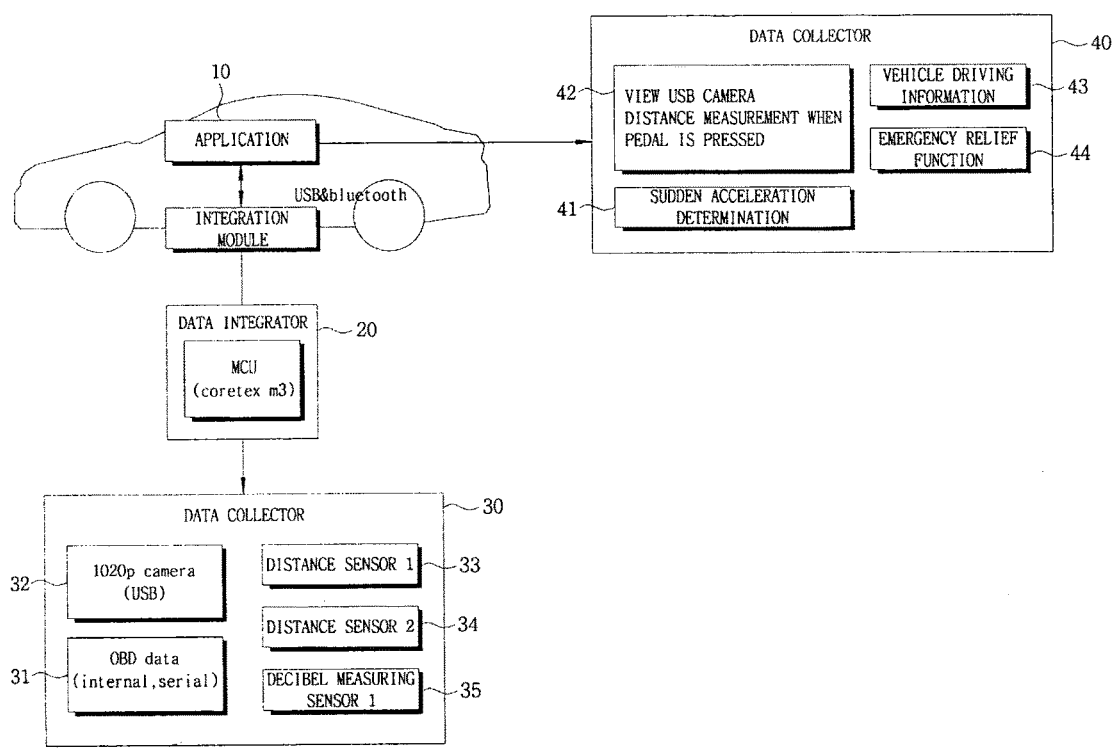
FIG. 1 is a block diagram illustrating an integrated analysis system for responding to sudden acceleration of a vehicle according to the present disclosure.
Figure 2A:
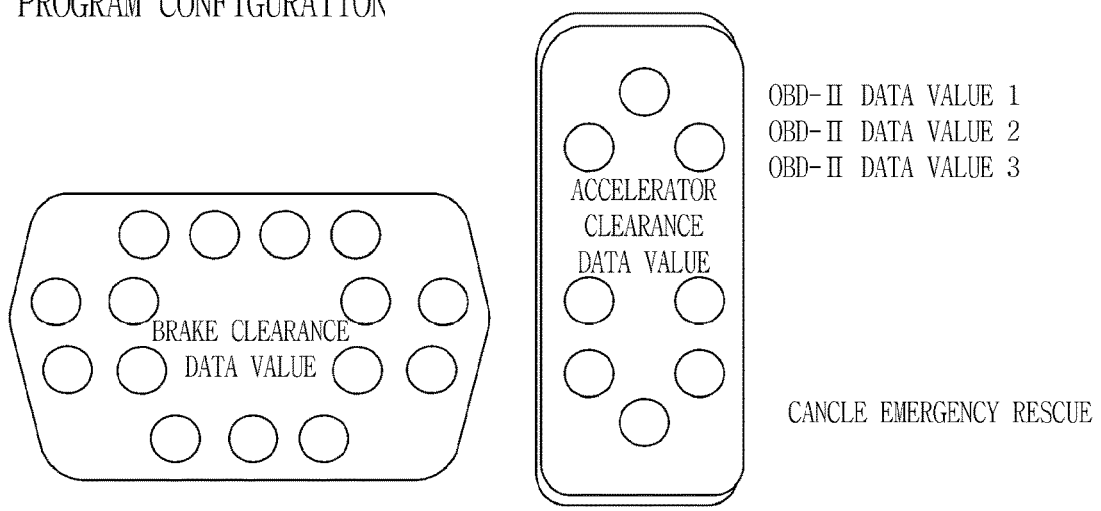
FIGS. 2A and 2B are views of user interfaces (UIs) for displaying images of an accelerator and a brake with a size thereof varied through image processing.
Figure 2B:
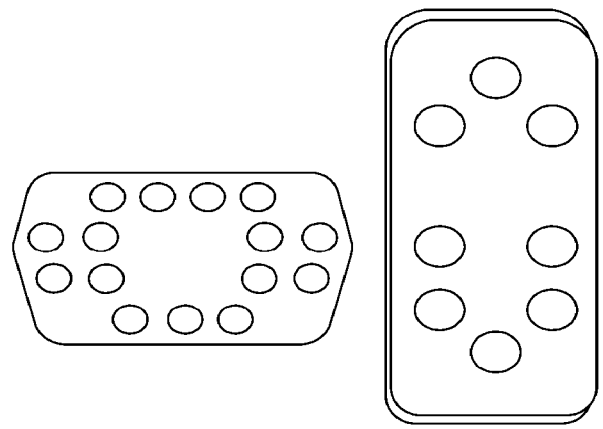
Figure 2B:
Figure 2B:
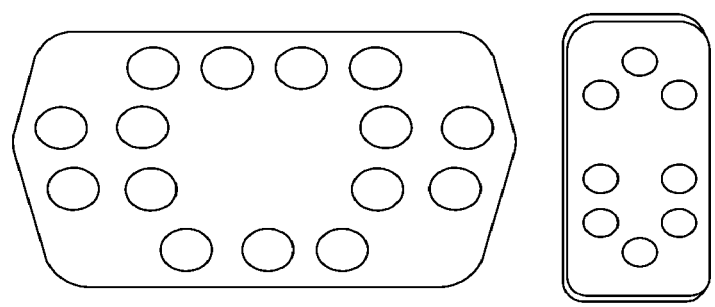

FIG. 1 is a block diagram illustrating an integrated analysis system for responding to sudden acceleration of a vehicle according to the present disclosure, and FIGS. 2A and 2B are views of user interfaces (UIs) for displaying images of an accelerator and a brake with a size varied through image processing.

The present disclosure is provided to identify a driver's way of manipulating a pedal at a time of sudden acceleration of a vehicle on the basis of an image and a sensor value, and allow the driver to effectively prepare for an accident due to the sudden acceleration.

The present disclosure is provided to make an intuitive decision by converting sizes of images of the accelerator and the brake through image processing of collected images such that a pedal image in an image is enlarged in proportion to a clearance applied thereto.

The integrated analysis system and method for responding to sudden acceleration of a vehicle according to the present disclosure includes components configured to identify the existence of an abnormality of a vehicle by checking data at a moment of sudden acceleration and transmit the information to an external server so that data loss is prevented.

In detail, referring to FIG. 1, the integrated analysis system for responding to sudden acceleration of a vehicle according to the present disclosure includes a data collector 30 configured to acquire an image of an accelerator pedal and an image of a brake pedal for vehicle control and collect on-board diagnostic (OBD) data and distance measurement values for measuring an extent to which the accelerator pedal and the brake pedal are applied and decibel values of an inside of a vehicle resulting from sudden acceleration; a data integrator 20 configured to perform an integration process by overlaying the measured data on the image collected by the data collector 30; a sudden acceleration determiner 10 configured to determine sudden acceleration of the vehicle by using image data integrated information integrated by the data integrator 20; and an image display 40 configured to provide a driver with sudden acceleration determination information obtained from the sudden acceleration determiner 10, the image data integrated information, vehicle driving information using the OBD data, and emergency relief information.

The data collector 30 includes an OBD data module 31 configured to continuously collect internal information of the vehicle by using OBD-II, a camera module 32 configured to acquire the image of the accelerator pedal and the image of the brake pedal for vehicle control, a first distance measuring sensor 33 configured to measure the extent to which the accelerator pedal is applied, a second distance measuring sensor 34 configured to measure the extent to which the brake pedal is applied, and a decibel measuring sensor 35 configured to collect a decibel value of the inside of the vehicle resulting from the sudden acceleration.

The image display 40 includes a sudden acceleration determination information display area 41 determined by the sudden acceleration determiner 10, an image data integrated information display area 42 allowing the driver to simultaneously check the image and a data value by having the data measured by the sensor module overlaid on the acquired image with the data value arrayed on the image, a vehicle driving information display area 43 using the OBD data, and an emergency relief guidance area 44 configured to provide guidance at a time of occurrence of the sudden acceleration such that an emergency is reported to an emergency rescue center on the basis of GPS information.

Referring to FIGS. 2A and 2B, the image data integrated information display area 42 is provided such that data for detecting sudden acceleration of a vehicle is checked, and the information is intuitively viewed by enlarging a size of a UI of the accelerator when the accelerator is pressed and enlarging a size of a UI of the brake when the brake is pressed depending on the extent to which the brake and the accelerator are applied.

The emergency relief guidance area 44 is configured to report an emergency at a time of the occurrence of sudden acceleration while sending unique information such as a vehicle type and a vehicle license number through a screen touch, and has a UI which is provided with a function of canceling the report such that an erroneous report is prevented.

The integrated analysis system for responding to sudden acceleration of a vehicle according to the present disclosure allows the driver to simultaneously check the image and the data value by having the data measured by the sensor module overlaid on the acquired image with the data value arrayed on the image, and allows information about an accident to be checked on a mobile terminal or the Internet through a microcontroller unit (MCU) while continuously collecting internal information of the vehicle by using OBD-II.

In the integrated analysis system for responding to sudden acceleration of a vehicle according to the present disclosure, the data collector 30 collects an image, OBD data, data of the first and second distance measuring sensors, and data of the decibel measuring sensor, and then an MCU of the data collector 20 integrates the collected image and data and transmits the integrated data to an application.

The application displays the camera image and the OBD data, and determines a sudden acceleration on the basis of the received information.

The integrated analysis system for responding to sudden acceleration of a vehicle according to the present disclosure allows a driver to flexibly handle sudden acceleration of a vehicle, a black box and a sensor are attached to a controller (an accelerator and a brake) of a vehicle such that an image of the controller is acquired by the black box, and a distance measuring sensor is attached to a sensor module such that an extent to which a vehicle pedal is applied is measured.

An integrated analysis method for responding to sudden acceleration of a vehicle according to the present disclosure will be described below in detail.

Figure 3:
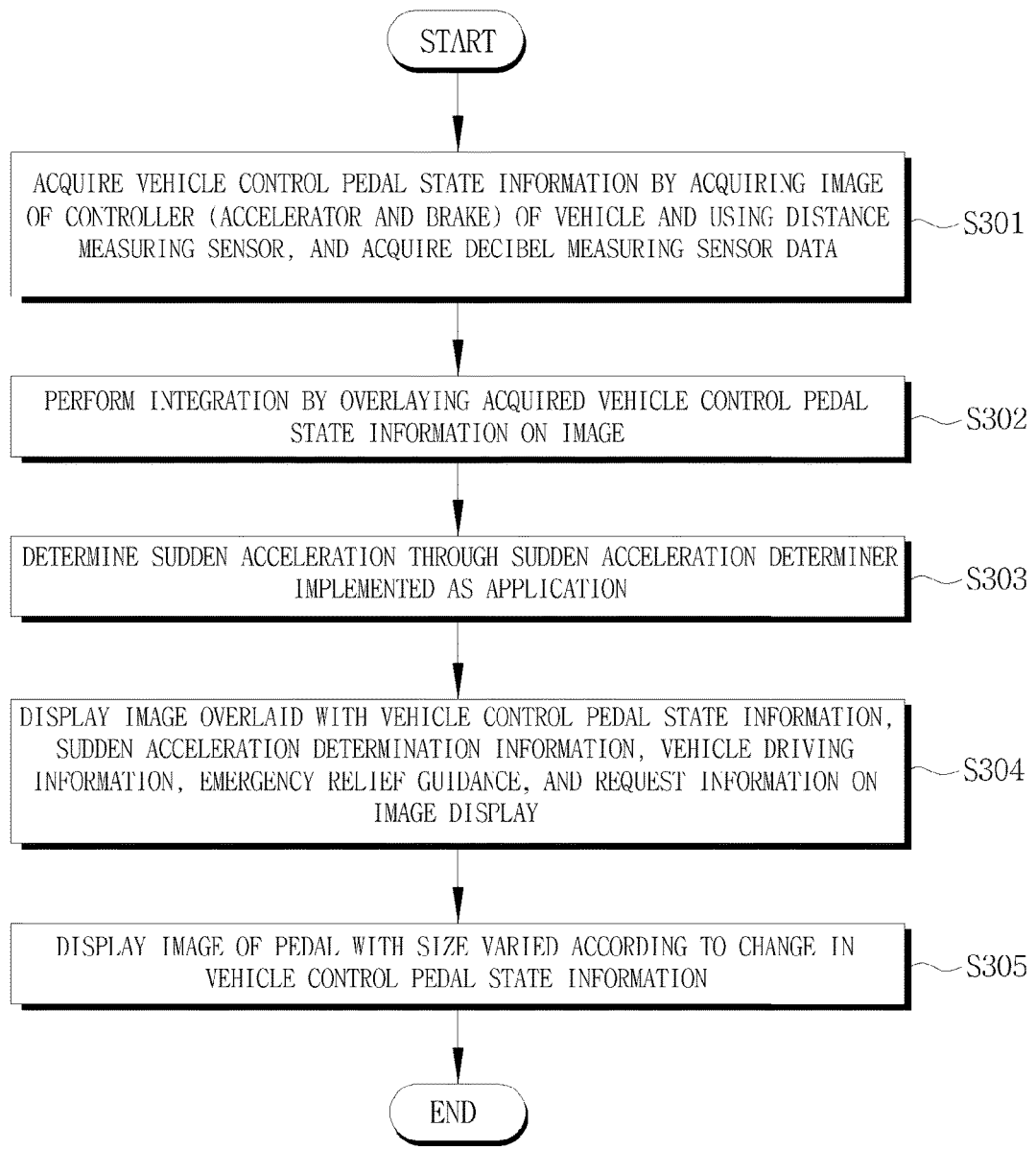
FIG. 3 is a flowchart showing an integrated analysis method for responding to sudden acceleration of a vehicle according to the present disclosure.

FIG. 3 is a flowchart showing an integrated analysis method for responding to sudden acceleration of a vehicle according to the present disclosure.

First, vehicle control pedal state information is acquired by acquiring an image of a controller (an accelerator and a brake) of a vehicle and using a distance measuring sensor, and decibel measuring sensor data is acquired (S301).

Then, the acquired vehicle control pedal state information is overlaid on the acquired image to be subject to integration processing (S302).

Sudden acceleration is determined through the sudden acceleration determiner 10 implemented as an application (S303).

The image overlaid with the vehicle control pedal state information, sudden acceleration determination information, vehicle driving information, and emergency relief guidance and request information are displayed on the image display 40 (S304).

An image of a pedal is displayed with a size varied according to a change in the vehicle control pedal state information (S305).

The integrated analysis system and method for responding to sudden acceleration of a vehicle according to the present disclosure are provided to effectively handle sudden acceleration of a vehicle through an integrated analysis of an image, measurement values of an accelerator distance measuring sensor and a brake distance measuring sensor, and a decibel measurement value at a time of the sudden acceleration, and, in order to determine whether the sudden acceleration of the vehicle is caused by driver error, a current control state of an accelerator and a brake of the vehicle are acquired as an image by a camera and a sensor attached to the accelerator and the brake of the vehicle and an extent to which the accelerator and the brake are applied is measured as a distance and is stored in the acquired image such that a party who caused the sudden acceleration accident may be determined to determine a true cause for an accident due to sudden acceleration.

As should be apparent from the above, the integrated analysis system and method for responding to sudden acceleration according to the present disclosure has the following advantageous effects.

First, the integrated analysis system and method for responding to sudden acceleration according to the present disclosure can effectively handle an accident due to sudden acceleration of a vehicle through an integrated analysis of an image and measuring sensor measurement values.

Second, the integrated analysis system and method for responding to sudden acceleration according to the present disclosure can effectively handle an accident due to sudden acceleration of a vehicle by increasing precision through an integrated analysis of an image, measurement values of an accelerator distance measuring sensor and a brake distance measuring sensor, and a decibel measurement value at a time of the sudden acceleration.

Third, the integrated analysis system and method for responding to sudden acceleration according to the present disclosure can precisely determine whether an accident due to sudden acceleration of a vehicle occurs due to a simple manipulation mistake of a driver or due to a defect of the vehicle.

Fourth, the integrated analysis system and method for responding to sudden acceleration according to the present disclosure can determine a party who caused an accident due to sudden acceleration and determine a true cause of the accident due to sudden acceleration by acquiring a current control state of an accelerator and a brake as an image and measuring an extent to which the accelerator and the brake are currently applied as a distance to store the extent together with the image.

Fifth, the integrated analysis system and method for responding to sudden acceleration according to the present disclosure can allow a driver to simultaneously check an image and a data value by measuring an extent to which a vehicle pedal is applied such that data measured by a sensor module is overlaid on an acquired image with the data value arrayed on the image.

Sixth, the integrated analysis system and method for responding to sudden acceleration according to the present disclosure can allow a driver to simultaneously check an image and a data value and allow information about an accident to be checked on a mobile terminal or the Internet through a MCU while continuously collecting internal information of the vehicle by using OBD-II.

Seventh, the integrated analysis system and method for responding to sudden acceleration according to the present disclosure can allow a driver to intuitively identify a vehicle control state by varying sizes of an accelerator pedal and a brake pedal in an image provided to a driver according to an extent to which the accelerator and the brake are applied.

The above description of the invention is for illustrative purposes, and a person having ordinary skilled in the art should appreciate that other specific modifications may be easily made without departing from the technical spirit or essential features of the invention.

Therefore, the above embodiments should be regarded as illustrative rather than limitative in all aspects. The scope of the present disclosure is not defined by the detailed description as set forth above, but by the accompanying claims of the invention. It should also be understood that all changes or modifications derived from the definitions and scope of the claims and their equivalents fall within the scope of the invention.

What is claimed is:

1. An integrated analysis system for responding to sudden acceleration of a vehicle, the integrated analysis system comprising:
    an OBD data module continuously collecting on-board diagnostic (OBD) data from a vehicle;
    a camera module acquiring an image of an accelerator pedal and an image of a brake pedal of the vehicle;
    a first distance measuring sensor measuring a displacement of the accelerator pedal;
    a second distance measuring sensor measuring a displacement of the brake pedal;
    a decibel measuring sensor measuring a noise level of an inside of the vehicle due to the sudden acceleration; and an image display displaying the images of the accelerator pedal and the brake pedal, vehicle driving information using the OBD data, and emergency relief information, wherein the image of the accelerator pedal is displayed such that a size of the image of the accelerator pedal is varied in proportional to the displacement of the accelerator pedal, and the image of the brake pedal is displayed such that a size of the image of the brake pedal is varied in proportional to the displacement of the brake pedal.

2. The integrated analysis system of claim 1, wherein the image display includes:

a first display area for displaying the images of the accelerator pedal and the brake pedal;

a second display area for displaying the vehicle driving information using the OBD data; and a third display area for displaying the emergency relief information to provide guidance at a time of the occurrence of the sudden acceleration such that an emergency is reported on the basis of GPS information.

3. The integrated analysis system of claim 2, wherein the third display area is configured to report the emergency at the time of the occurrence of the sudden acceleration while sending unique information including a vehicle type and a vehicle license number, and has a user interface (UI) provided with a function of canceling the report to prevent an erroneous report.

4. An integrated analysis method comprising:

collecting, by an OBD data module, on-board diagnostic (OBD) data from a vehicle;

acquiring, by a camera module, an image of an accelerator pedal and an image of a brake pedal of the vehicle;

measuring, by a first distance measuring sensor, a displacement of the accelerator pedal;

measuring, by a second distance measuring sensor, a displacement of the brake pedal;

measuring, by a decibel measuring sensor, a noise level of an inside of the vehicle due to the sudden acceleration; and displaying, by an image display, the images of the accelerator pedal and the brake pedal, vehicle driving information using the OBD data, and emergency relief information, wherein the image of the accelerator pedal is displayed such that a size of the image of the accelerator pedal is varied in proportional to the displacement of the accelerator pedal, and the image of the brake pedal is displayed such that a size of the image of the brake pedal is varied in proportional to the displacement of the brake pedal.

5. The integrated analysis method of claim 4, wherein the displaying of the image includes reporting an emergency at a time of the occurrence of the sudden acceleration while sending unique information including a vehicle type and a vehicle license number, and an emergency relief guidance area has a user interface (UI) provided with a function of canceling the report to prevent an erroneous report.

* * * * *